(12) United States Patent
Chung et al.

(10) Patent No.: US 7,043,430 B1
(45) Date of Patent: May 9, 2006

(54) SYSTEM AND METHOD FOR SPEECH RECOGNITION USING TONAL MODELING

(75) Inventors: Grace Chung, Arlington, VA (US); Hong Chung Leung, Kowloon Tong (HK); Suk Hing Wong, Kowloon Tong (HK)

(73) Assignee: Infotalk Corporation Limitied, Hong Hong (HK)

( * ) Notice: Subject to any disclaimer, the term of this patent is extended or adjusted under 35 U.S.C. 154(b) by 631 days.

(21) Appl. No.: 10/130,490

(22) PCT Filed: Nov. 22, 2000

(86) PCT No.: PCT/US00/32230
§ 371 (c)(1),
(2), (4) Date: Jan. 29, 2003

(87) PCT Pub. No.: WO01/39179
PCT Pub. Date: May 31, 2001

Related U.S. Application Data

(60) Provisional application No. 60/167,172, filed on Nov. 23, 1999.

(51) Int. Cl.
*G10L 15/00* (2006.01)
(52) U.S. Cl. .................... 704/251; 705/250
(58) Field of Classification Search ............. 704/251, 704/255
See application file for complete search history.

(56) References Cited

U.S. PATENT DOCUMENTS

| | | | |
|---|---|---|---|
| 4,937,870 A | 6/1990 | Bossemeyer, Jr. | |
| 5,327,521 A | 7/1994 | Savic et al. | |
| 5,583,961 A | 12/1996 | Pawlewski et al. | |
| 5,602,960 A * | 2/1997 | Hon et al. | 704/207 |
| 5,884,253 A | 3/1999 | Kleijn | |
| 5,907,826 A * | 5/1999 | Takagi | 704/251 |
| 6,510,410 B1 * | 1/2003 | Chen et al. | 704/251 |

* cited by examiner

*Primary Examiner*—Daniel Abebe
(74) *Attorney, Agent, or Firm*—Jones Day

(57) ABSTRACT

A system and method for speaker independent speech recognition is provided that integrates spectral and tonal analysis in a sequential architecture. The system analyzes the spectral content of a spoken syllable, or group of syllables, (18) and generates a spectral score for each of a plurality of predicted syllables (46, 22). Time alignment information (36) for the predicted syllable(s) is then sequentially passed to a tonal modeling block (14) which performs an iterative fundamental frequency contour estimation for the spoken syllable(s). The tones of adjacent syllables, as well as the rate of change of the tonal information, is then used to generate a tonal score for each of the plurality of predicted syllables. The tonal score (34) is then arithmetically combined with (40) the spectral score (32) in order to generate an output prediction.

46 Claims, 3 Drawing Sheets

SYSTEM AND METHOD FOR SPEECH RECOGNITION USING TONAL MODELING

CROSS REFERENCE TO RELATED APPLICATION

This application is a 371 of PCT/US00/32230 filed on Nov. 22, 2000 which claims benefit of 60/167,172 filed on Nov. 23, 1999.

BACKGROUND

1. Technical Field

The present invention is directed to the field of speech recognition. More specifically, the invention provides a speaker-independent speech recognition system and method for tonal languages in which a spectral score is combined, sequentially, with a tonal score to arrive at a best prediction for a spoken syllable.

2. Description of the Related Art

Recently, there have been many advancements in speech recognition systems. Most of these systems, however, are developed for western languages such as English, which are non-tonal, as distinguished from many eastern languages such as Chinese, which are tonal. In a tonal language, the tone of the speech is related to its meaning, and therefore it is insufficient to simply analyze the spectral content of the spoken syllable(s), as can be done in analyzing non-tonal languages. A tonal language typically has four to nine tones. For example, these tones are classified into "high," "rising," "dip," or "falling" in Mandarin Chinese, which has four tones. Explicit recognition of these tones is difficult, however, since different speakers have different speaking characteristics. In languages such as Chinese, tones are characterized by features such as the fundamental frequency (F0) values and corresponding contour shapes. These values and shapes are difficult to capture and properly analyze for speaker-independent recognition because the absolute value of F0 varies greatly between speakers. For example, the high tone of a low-pitch speaker can be the same or similar to the low tone of a high-pitch speaker.

Several known speech recognition systems for tonal languages are described in CN 1122936, U.S. Pat. No. 5,787,230, CN 1107981, CN 1127898, U.S. Pat. No. 5,680,510, U.S. Pat. No. 5,220,639, WO 97/40491, WO 96/10248, and U.S. Pat. No. 5,694,520 Many of these systems, however, rely on the absolute value of the syllable's fundamental frequency (F0) in order to ascertain the proper tone, and thus fail to properly discriminate between speakers having differing tonal characteristics. These systems typically must be "trained" for a particular speaker prior to proper operation. In addition, each of these systems utilizes a parallel processing architecture that prohibits an integrated analysis of the spectral and tonal information, thus further limiting their usefulness in a speaker-independent application.

SUMMARY

A system and method for speaker-independent speech recognition is provided that integrates spectral and tonal analysis in a sequential architecture. The system analyzes the spectral content of a spoken syllable (or group of syllables) and generates a spectral score for each of a plurality of predicted syllables. Time alignment information for the predicted syllable(s) is then sequentially passed to a tonal modeling block, which performs an iterative fundamental frequency (F0) contour estimation for the spoken syllable(s). The tones of adjacent syllables, as well as the rate of change of the tonal information, is then used to generate a tonal score for each of the plurality of predicted syllables. The tonal score is then arithmetically combined with the spectral score in order to generate an output prediction.

An aspect of the present invention provides a speech recognition method that may include the following steps: (a) receiving a speech waveform; (b) performing a spectral analysis of the speech waveform and generating a set of syllabic predictions, each syllabic prediction including one or more predicted syllables, wherein the set of syllabic predictions includes a spectral score and timing alignment information of the one or more predicted syllables; (c) sequentially performing a tonal analysis of the input speech waveform using the timing alignment information and generating tonal scores for each of the syllabic predictions; and (d) combining the spectral score with the tonal score for each of the syllabic predictions in order to generate an output prediction.

Another aspect of the invention provides a speech recognition system that includes several software and/or hardware implemented blocks, including: (a) a spectral modeling block that analyzes a speech waveform and generates a plurality of predicted syllables based upon the spectral content of the speech waveform, wherein each of the predicted syllables includes an associated spectral score and timing alignment information indicating the duration of the syllable; and (b) a tonal modeling block that sequentially analyzes the speech waveform using the timing alignment information from the spectral modeling block and generates a plurality of tone scores based upon the tonal content of the speech waveform for each of the predicted syllables.

Still another aspect of the invention provides a system for analyzing a speech waveform. This system preferably includes a spectral modeling branch for generating a spectral score, and a tonal modeling branch for generating a tonal score The spectral modeling branch generates timing alignment information that indicates the beginning and ending points for a plurality of syllables in the speech waveform and provides this timing alignment information to the tonal modeling branch in order to sequentially analyze the speech waveform.

An additional method according to the invention provides a method for analyzing a speech waveform carrying a plurality of syllables. This method preferably includes the following steps: (a) performing a spectral analysis on the speech waveform and generating one or more spectral scores for each syllable; (b) performing a tonal analysis on the speech waveform and generating one or more tonal scores for each syllable, wherein the tonal scores are generating by comparing the fundamental frequencies of two or more adjacent syllables; and (c) combining the spectral scores with the tonal scores to produce an output prediction.

Still another, more specific method according to the invention provides a method of recognizing tonal information in a speech waveform. This method preferably includes the following steps: (a) generating timing alignment information for a plurality of syllables in the speech waveform; (b) determining a center point within each syllable of the speech waveform using a beginning and ending point specified by the timing alignment information; (c) determining the energy of the syllable at the center point; (d) generating an analysis window for each syllable, wherein the analysis window is centered at the center point and is bounded on either side of the center point by calculating the points at which the energy of the syllable has decreased to a first predetermined percentage of the energy at the center point; (e) computing a fundamental frequency contour within the analysis window; (f) extracting one or more tonal features from the fundamental frequency contour; and (g) generating a plurality of tonal scores for each syllable based on the one or more extracted tonal features.

Other aspects of the invention, not set forth specifically above, will be apparent to one of skill in this field upon reading the description of the drawings, set forth below.

DETAILED DESCRIPTION

Figure 1:
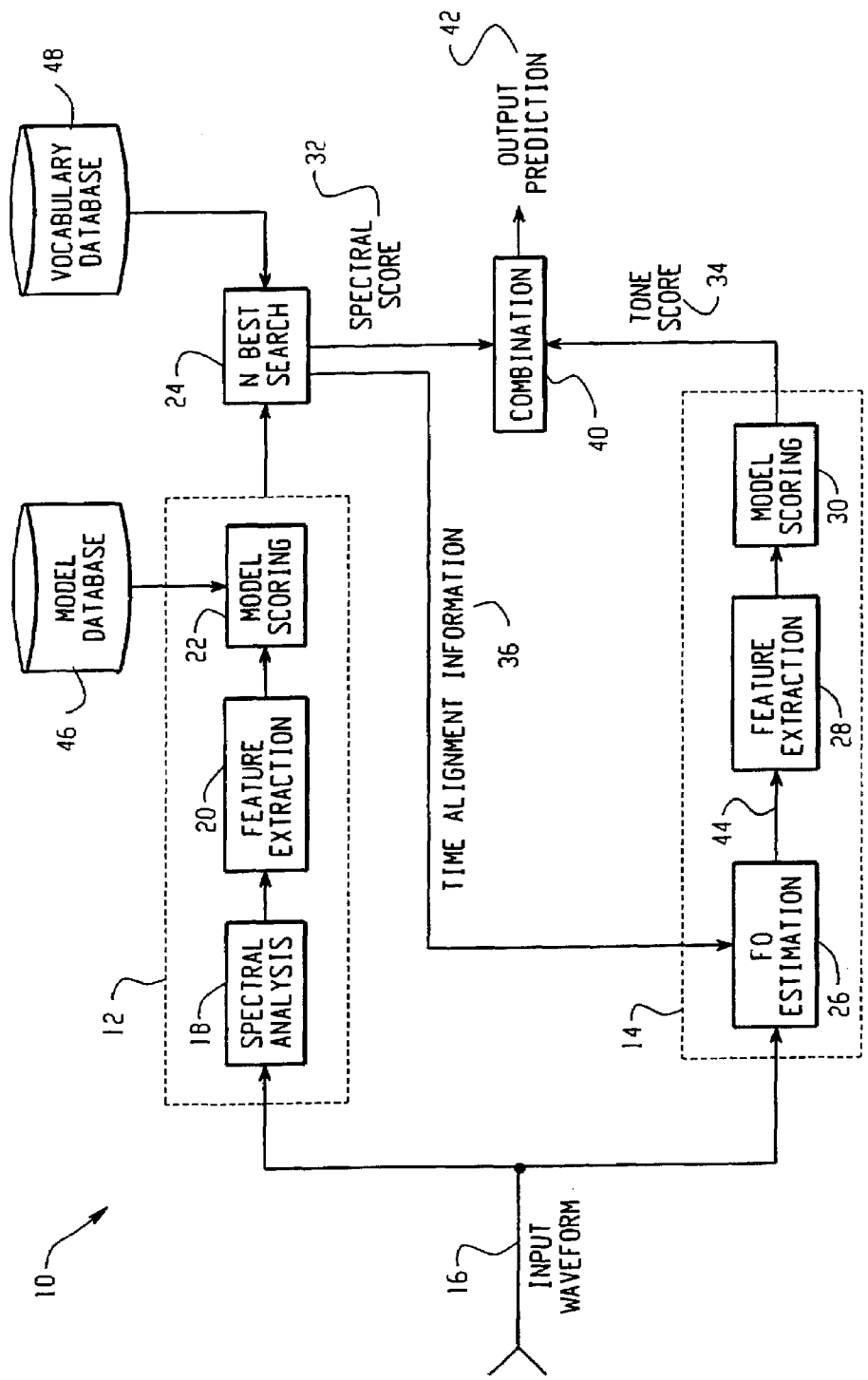
FIG. 1 is a block diagram of a speaker-independent speech recognition system according to the present invention.

Turning now to the drawing figures, FIG. 1 is a block diagram of a speaker-independent speech recognition system according to the present invention. This system includes two branches (or paths), an upper branch 12, which performs spectral modeling of an input waveform and produces a spectral score 32, and a lower branch 14, which performs tonal modeling based on the input waveform and also based upon information received from the upper branch 12, and produces a tonal score 34. A combination block then combines the spectral score 32 with the tonal score 34 in order to generate a best output prediction 42 for the spoken syllable(s). In this fashion, the present invention provides a sequential architecture for speech recognition in which information from the spectral analysis is used in the tonal analysis to provide a more robust result.

Not explicitly shown in FIG. 1 is front-end hardware (or software) for generating the input waveform 16, and back-end hardware (or software) for using the output prediction 42. This front-end hardware may include a microphone, an analog-to-digital converter and a digital signal processor (DSP), depending upon the application of the system. For example, the system 10 could be integrated into a variety of applications, such as a general-purpose speech recognition program, a telephone, cellular phone, or other type of electronic appliance, or any other type of software application or electronic device that may require speaker-independent speech recognition capability. Preferably, however, the input waveform 16 is a digital waveform.

The spectral modeling branch 14 includes a spectral analysis block 18, a feature extraction block 20, a model scoring block 22, and an N-best search block 24. The model scoring block 22 receives information from a model database 46, and the N-best search block 24 receives information from a vocabulary database 48.

The spectral analysis block 18 receives the input waveform 16 and performs a frequency-domain spectral analysis of the spoken syllable(s). Example spectral analysis could include a fast-fourier transform (FFT), or a mel frequency cepstral coefficients analysis (MFCC), or a linear protection coefficient analysis (LPC). Regardless of the exact type of spectral analysis performed, the spectral analysis block 18 generates a sequence of frames that include a multi-dimensional vector that describes the spectral content of the input waveform 16.

The sequence of frames from the spectral analysis block 18 are then provided to the feature extraction block 20. The feature extraction block analyses the multi-dimensional vector data in the sequence of frames and generates additional dimensionality data that further describes certain features of the input waveform 16. For example, the feature extraction block 20 may compute a differential between two adjacent frames for each of the dimensions in the vector, and it may then computer a differential of the computed differential, or it may compute energy, or some other related calculation. These calculations relate to certain features of the spoken syllables that can be further utilized by the model scoring block 22 in order to properly predict the actual speech.

The multi-dimensional vector data from the spectral analysis block 18 and the additional computations from the feature extraction block 20 (collectively referred to as the feature vector) are then provided to the model scoring block 22. The model scoring block may use a Gaussian distribution function in order to compute a probability result that the feature vector corresponds to a particular spectral model of some syllable (or syllables). At this point it is important to note that the system described herein could be configured at a variety of levels of granularity. Thus, for example, the system may be configured to analyze one letter at a time, or one syllable at a time, or a group of syllables at a time, or entire words at a time. Regardless of the granularity of the analysis, however, the basic steps and functions set forth would be the same.

The model scoring block 22 utilizes data from a model database 46 in computing its probabilities for a particular set of input data (feature vector). The model database preferably includes a Hidden Markov Model (HMM), although other types of models could also be utilized. For more information on the HMM, see *Robustness in Automatic Speech Recognition*, by Hisashi Wakita, pp. 90–102. Using the input data from the spectral analysis block 18 and the feature extraction block 20, the model scoring block develops a prediction (or score) for each entry in the model database. Higher scores are associated with more likely spectral models, and lower scores with less likely models.

The scores for each of the models from the model scoring block 22 are then passed to the N-Best search block 24, which compares these scores to data stored within a vocabulary database in order to derive a set of predictions for the most likely spoken syllables (or letters, or words depending on the application). The vocabulary database is typically organized into a series of words that include syllables and tones associated with those syllables, although other symantical organizations for the vocabulary are certainly possible. If the vocabulary is on a word level, then the scores at the frame level (or syllable level) may be combined by the N-best search block 24 prior to comparison to the data in the vocabulary database 48.

The N-Best search block 24 provides two outputs 32, 36. The first output is a set of spectral scores 32 for the most likely syllables (or words or sentences) as determined by comparing the model scoring information to the data stored in the vocabulary database 48. These spectral scores 32 are preferably described in terms of a probability value, and are then provided to the combination block 40 for combination with the tonal scores 34.

For each of the set of most likely syllables, the N-Best search block 24 also provides time alignment information 36, which is provided o the F0 estimation block 26 of the tonal analysis branch 14. The time alignment information 36 includes information as to where (in time) a particular syllable begins and ends. This information 36 also includes the identity of the predicted syllables (and their associated tone) as determined by the N-Best search block 24. Thus, for example, if the N-Best search block is configured to predict the three most likely syllables spoken, then the time alignment information 36 passed to the F0 estimation block 26 would include beginning and ending timing information for each of the three syllables, the identity of the syllable, and its tone.

In the tonal modeling section 14, the input speech waveform 16 undergoes analysis by an F0 estimation block 26, a feature extraction block 28, and a model scoring block 30. In the following description, it is illustrative to examine FIG. 1, as well as FIG. 2, which is a flowchart depicting a series of steps for F0 contour estimation 26 according to the present invention.

The general operation of the tonal analysis branch 14 is as follows. The input waveform 16 is input to the fundamental frequency (F0) estimation block 26, which also receives the time alignment information 36 from the N-Best search block 24. The F0 estimation block 26 uses the input waveform and the time alignment information in order to output an F0 contour 44, as further described below. The F0 contour 44 determination is preferably based on the Average Magnitude Difference Function (AMDF) algorithm. Following the F0 contour determination, the system then extracts numerous features from the F0 contour of the input waveform using a feature extraction block 28, such as the ratio of the average F0 frequencies of adjacent syllable pairs and the slope of the first-order least squares regression line of the F0 contour. These features are then input to a statistical model 30 that preferably uses a two-dimensional full-covariance Gaussian distribution to generate a plurality of tone scores 34 for each of the predicted syllables from the N-Best search block 24. The tone score 34 is combined, preferably linearly, with the spectral score 32 from the spectral analysis branch 12 for each of the predicted syllables in order to arrive at a set of final scores that correspond to an output prediction 42.

The tonal modeling section 14 is now described in more detail.

1. F0 Estimation Algorithm

Figure 2:
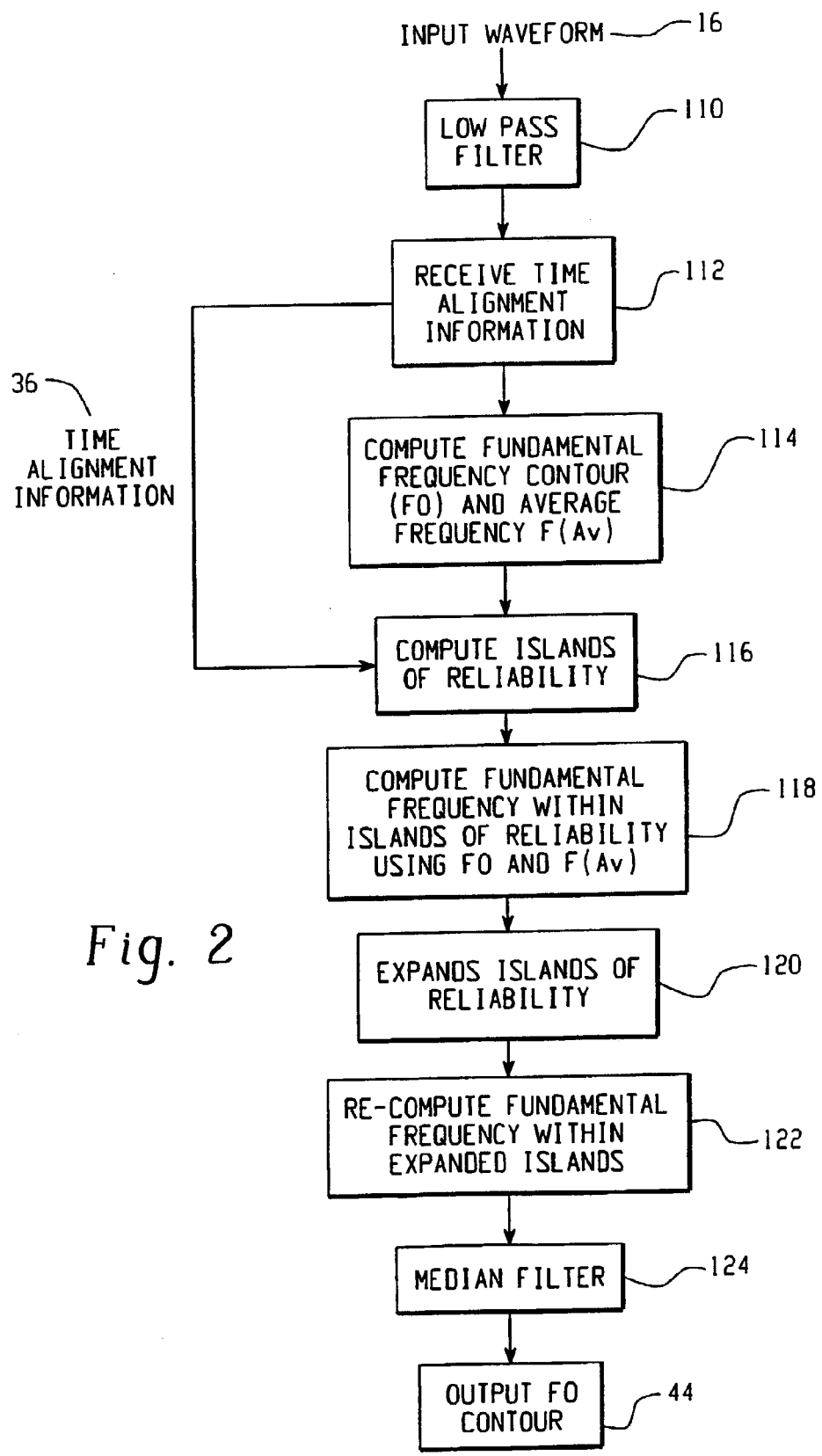
FIG. 2 is a flowchart depicting a series of steps for F0 contour estimation according to the present invention.

FIG. 2 is a flowchart depicting a series of steps for F0 contour estimation 26 according to the present invention. The F0 estimation algorithm involves an initial second order lowpass filtering operation 110, followed by a methodology based on the AMDF algorithm. The basic description is as follows.

1.1 Low Pass Filtering

The second order lowpass filter step 110 on the input waveform 16 preferably is described by the following transfer function:

$$H(z) = \frac{1}{1 - 1.6z^{-1} + 0.64z^{-2}}$$

This operation will eliminate high frequency noise in the input signal. Other transfer functions, and other types of filtering operations could also be executed at this stage of the methodology.

1.2 Alignment

Following the low-pass filtering step 110, the F0 estimation block 26 then receives the time alignment information 36 at step 112 from the N-Best search block 24 of the spectral modeling branch 12. As described previously, this information 36 includes beginning and ending timing information for each of the predicted syllables from the spectral analysis, and also includes the identity of the predicted syllables and their corresponding tones. The primary purpose of the tonal modeling block is to predict which of these spectral analysis predictions is most likely given an analysis of the tonal information in the actual input waveform 16. A center point for each syllable can then be identified by determining the point of maximum energy within the syllable.

1.3 AMDF

Following step 112, the F0 estimator block 26 computes the fundamental frequency contour for the entire frame at step 114 using the AMDF algorithm, the frame corresponding to a particular prediction (which could be a letter, syllable, word or sentence as discussed above). This step also computes the average frequency $F_{AV}$, for the entire frame of data. The AMDF algorithm produces an estimate of the fundamental frequency using an N data point length window of the lowpass filtered waveform 16 that corresponds to the type of prediction. In this method, a difference function is computed at each frame where a value of fundamental is required. The equation for the difference function is as follows:

$$y_n(k) = \sum_{m=0}^{N} x(n+m) - x(n+m-k)$$

in which $y_n(k)$ dips sharply for $k=P, 2P, \ldots$, where P is the fundamental period. Since period is the inverse of frequency, by determining the periodicity of the waveform, the fundamental frequencies can be derived.

Thus, each local minimum of this difference function is associated with a multiple of the fundamental period. In general, the fundamental period is identified at the point where the global minimum within the N-point window occurs. However, due to various distortions in the speech waveform and effects such as laryngealization, this is often not the case. In fact, particularly at vowel-consonant transition boundaries, the global minimum can occur at half or integer multiples of the fundamental period, and therefore, estimation of the contour is highly prone to error. These halving or doubling errors manifest as large deviations in the fundamental contour when, in fact, the true contour itself is smooth, with only small gradations in changes. So, in order to ameliorate such errors, it is necessary to employ other means in order to choose the correct local minimum, which represents the fundamental period. In this algorithm, multiple passes are subsequently conducted through the waveform in order to choose the correct minimum that corresponds with the fundamental period. These additional steps are described below with reference to steps 116–122.

1.4 Iterative F0 Re-Estimation

Figure 3:
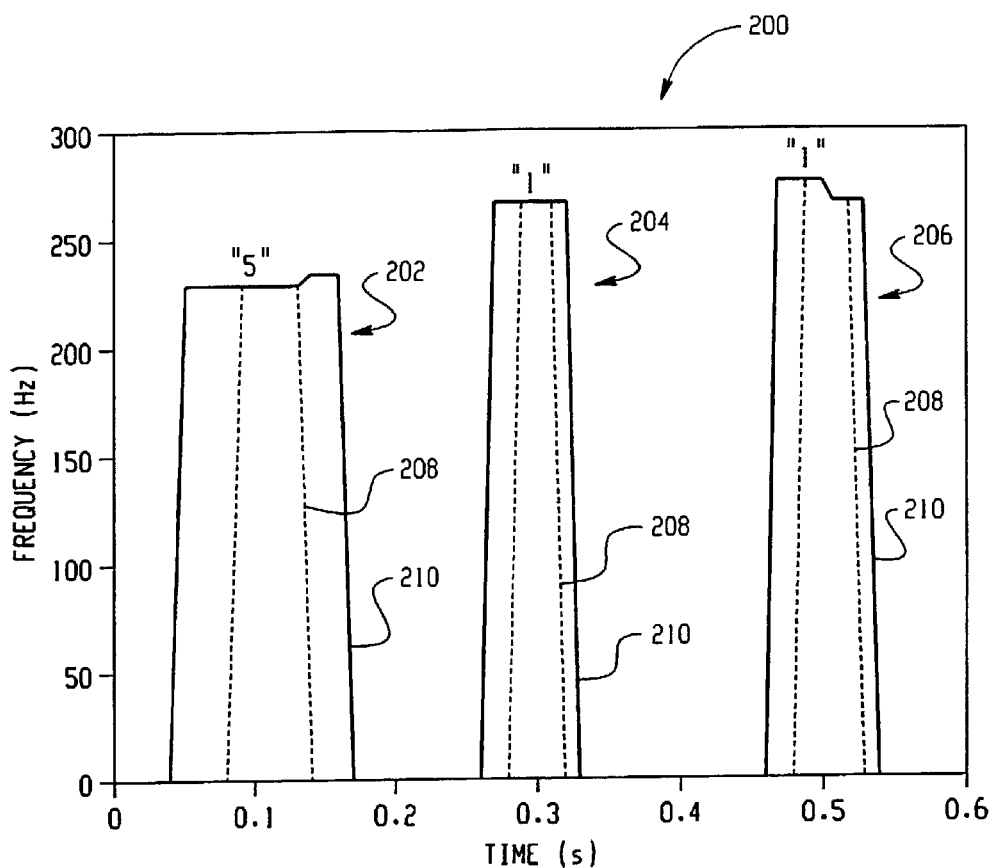
FIG. 3 is an example F0 contour plot generating by the methodology of the present invention depicting three spoken syllables.

The actual F0 contour estimation set forth in FIG. 3 consists of several passes through the entire spoken utterance (i.e., all the data present in the input waveform 16. This is done in order to reduce the number of halving or doubling errors. These errors are more susceptible at the edges of the vowel, that is at the consonant-vowel transition boundaries. Also, if voicing is absent, the estimation of F0 is meaningless and the value of F0 should be ignored. In the absence of an accurate alignment of the vowel-consonant boundary, it is necessary to incorporate automatic voicing detection into the F0 estimation algorithm.

1.4.1 Islands of Reliability

In order to reduce these halving and doubling errors, the present invention introduces the concept of "islands of reliability." These islands of reliability are first computed in step 116 of the preferred methodology utilizing the time alignment information 36 received at step 112. The point of maximum energy near the center of each syllable has been previously obtained in step 112 from an alignment provided by the spectral analysis branch. The speech segment in which energy remains above P percent of the maximum is then marked as an island of reliability in step 116. Here, the value of "P" is a predetermined amount and may vary from application to application. The concept of the island of reliability is to provide a speech segment over which the basic F0 estimator or AMDF algorithm produces very reliable results. FIG. 3 sets forth a portion of the F0 contour 200 for three spoken syllables 202, 204, 206 in which the initial island of reliability for each syllable is shown as 208.

For this first pass, at a fixed interval of frames, the difference function set forth above is computed whenever the frame falls within an island of reliability. The fundamental period, pertaining to that frame, is chosen as the global minimum of the difference function. Any local minimums are ignored at this stage of the process. Then, an overall average F0 is computed from all such values computed. This forms an initial estimate that indicates the average pitch, $F_{AV}$ of the speaker's voice and the final fundamental frequency contour should reside around this vicinity.

1.4.2 F0 Estimation

As a second pass through the waveform, the F0 contour is established within the islands of reliability, but this time both global and local minimums are considered. Again the difference function is computed for all frames that lie within these islands. Now, in order to determine the true pitch contour, two sources are utilized to make each estimate from the difference function, $y_n(k)$, as defined above. The algorithm searches for (i) the global minimum $K_G$ of the difference function and (ii) the local minimum $K_L$ that is closest to the period of the average fundamental, $F_{AV}$, as computed in the first pass above. The global minimum, $K_G$ in (i), is always chosen if the value of the minimum is much less than the other local minimum (ii) by some predetermined threshold scaled value. Otherwise $K_L$ in (ii) is chosen. Therefore, $$F_0 = \begin{cases} 1/K_G & \text{if } y_n(K_G) < \delta \times y_n(K_L) \\ 1/K_L & \text{otherwise} \end{cases}$$

In this manner, the F0 contour is predicted from left to right of the utterance at the marked islands of reliability. The reason that $K_L$ is chosen over $K_G$, unless $K_G$ is much less than the other local minimum, is that a typical speaker's tone cannot change very rapidly, and thus it is more likely that the correct F0 calculation is based on the local minima that is closest to the average fundamental frequency for the entire data frame.

1.4.3 Island Expansion

The next pass through the speech data involves the determination of the F0 contour from each boundary of the initial islands of reliability to points on either side of the islands at which the energy of the waveform drops below R percent of the maximum energy within the island. In this pass 120, the boundary at which voicing in the vowel terminates is determined. This is done by examining the data frame to the left or right of the initial island boundaries and then assuming that when the energy in the frame data drops below R percent of its maximum value at the vowel center in the initial island of reliability, the F0 estimate would not be reliable. This is due to the absence of voicing, and so the F0 values are ignored beyond this cutoff point. In this manner, the initial islands of reliability are expanded to the right and left of the initial boundaries. FIG. 3 sets forth a portion of the F0 contour 200 for three spoken syllables 202, 204, 206 in which the initial island of reliability for each syllable is shown as 208, and the expanded island of reliability for each syllable is shown as 210.

At step 122, the fundamental frequency contour F0 is then recomputed over the expanded island of reliability. For the F0 contour to the right of each island of reliability 208, the contour is estimated from left to right, and vice versa for the F0 contour to the left of each island. Again, for every time the difference function is computed, two particular locations are marked. The method searches for (i) the global minimum $K_G$ and (ii) the local minimum $K_L$ whose occurrence is most proximate to the fundamental period value to the immediate left of the current estimated value. The global minimum $K_G$ in (i) is always chosen if the value of the minimum is much less than the other local minimum (ii) by some predetermined threshold value $\delta$. Otherwise $K_L$ in (ii) is chosen as the fundamental period.

These steps 120, 122 are very similar to the F0 estimation within the islands of reliability in step 118. In a similar fashion, the procedure continues from right to left to estimate the fundamental frequency values to the left of the islands of reliability, beginning at the left boundary of each of these islands and terminating when energy falls below R percent of the maximum energy within the syllable.

This method uses the global minimum of the difference function, $y_n(k)$, as an estimate of the fundamental period if that value is not very far from previous estimates of the pitch contour. In many cases the minimum calculations in (i) and (ii) will coincide at the same point and there is no question of where the fundamental period occurs. The aim is to produce a fundamental contour that is as smooth as possible with a minimum number of discontinuities and sudden changes is likely to be closer to the true contour.

1.5 Median Filtering

As an additional measure to produce a smoother contour, a five-point median filter is applied in step 124. This operation is used to smooth the contour data, and produces the F0 contour output 44, which is then supplied to the feature extraction block 28 of the tonal analysis branch 14.

2. Tone Feature Extraction and Modeling Algorithm

After the F0 contour has been computed, features are extracted pertaining to tone information for generating a tonal score, which will eventually be combined with the spectral score in order to arrive at a final output prediction 42. These steps are carried out by the feature extraction block 28 and the model scoring block 30. The tone model is preferably based on a two-dimensional full-covariance Gaussian model, although other tonal models could also be used. During training of this type of model, a separate sub-model for each unique combination of tone pairs is built. Each syllable in the vocabulary database 48 is associated with a tone of its own. Therefore, for a vocabulary of N syllables, there is a total of N squared sub-models.

The tone model preferably consists of two dimensions: (1) a ratio of the average tone frequency of a syllable to the average tone frequency of the following syllable (in order to compare to the tone pairs); and (2) a slope of the fundamental frequency F0 as estimated by a regression line of one of the syllables. In (1), the tone frequency is estimated by averaging the F0 frequencies for each syllable and then the ratio of adjacent syllables is taken. In (2) the slope of the contour at the syllable is estimated by a first order least squares linear regression line. These two features are provided by the feature extraction block 28 operating on the output F0 contour 44 from the F0 estimation block 26, and are then provided to the model scoring block which derives a Gaussian score 34 for each pair of adjacent syllables. By scoring the tonal information based on adjacent tones, the present invention overcomes a primary disadvantage of known systems that only derive tonal information based on the absolute value of the fundamental frequency F0 contour, and which do not take into account adjacent tones. This advantage of the present invention enables use in a speaker-independent environment.

Having computed the spectral score 32 for a particular set of predictive syllables from the spectral branch 12, and having computed the corresponding tonal score 34 for the same set of predictive syllables from the tonal branch 14, the system shown in FIG. 1 then combines these scores in a combination block 40, as further discussed below, in order to derive a final output prediction 42.

The combination block 40 need only take into account those tone scores that correspond with syllables whose hypothesized predictions are different from the ones in the same positions in any of the N hypotheses. In other words, if for all N hypotheses, the syllable pair in question is hypothesized the same for each case and hence yielding the same tone score, then that score is ignored. Effectively, the combination block 40 only takes into account those tone scores in which the hypotheses are different in at least one of the N hypotheses are kept. At each hypothesis, these tone scores are averaged over the number of syllable pairs whose tone scores are nonzero to form the tone score $S_t$. For example, in the following example the number of hypotheses, N=3, and αi are hypothesized syllables in an utterance with five syllables:

Hyp 1: α1 α2 α3 α4 α5
Hyp 2: α6 α7 α3 α4 α5
Hyp 3: α6 α7 α3 α4 α6

Only the first two and final syllables differ in their hypothesized labels for the three hypotheses and the rest are identical. Therefore, if s(αiαj) represents the tone score 34 for the syllable pair αi and αj then, St=(s(α1α2)+s(α2α3)+s(α4α5))/3 for hyp1 and St=(s(α6α7)+s(α7α3)+s(α4α5))/3 for hyp 2 and St=(s(α6α7)+s(α7α3)+s(α4α6))/3 for hyp 3. Finally, St is scaled with a predetermined scaling factor β and is subsequently combined with the spectral score Ss for the utterance to form the final score $S_{TOTAL}$.

$$S_{TOTAL}=St+\beta Ss$$

This final score is then used to reorder the hypotheses to produce a new N-best list as a final output prediction 42.

Figure 4:
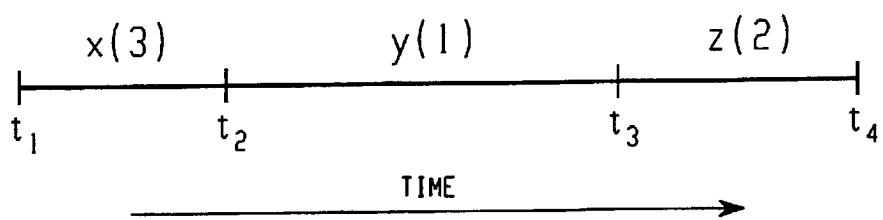
FIG. 4 is a timing diagram depicting three spoken syllables including tonal information.

FIG. 4 is a timing diagram depicting three spoken syllables including tonal information. This figure illustrates a sequence of three syllables: x(3), y(1), and z(2), where x, y, and z denote the syllables and the digits inside the parentheses, (3), (1), and (2), denote the tones of the respective syllables. When the tone-recognition component of the present invention computes the probability of having Tone 3 between t1 and t2 and having Tone 1 between t2 and t3, it utilizes the pitch information between t1 and t3. This strategy has two advantages: (1) it reduces the sensitivity of the recognition software to different speaking characteristics of the speakers; and (2) it captures co-articulatory effects of two adjacent syllables and tones.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

We claim:

1. A speech recognition method, comprising the steps of:
   receiving a speech waveform;
   performing a spectral analysis of the speech waveform and generating a set of syllabic predictions, each syllabic prediction including one or more predicted syllables, wherein the set of syllabic predictions includes a spectral score and timing alignment information of the one or more predicted syllables;
   sequentially performing a tonal analysis of the input speech waveform using the timing alignment information and generating tonal scores for each of the syllabic predictions; and
   combining the spectral score with the tonal score for each of the syllabic predictions in order to generate an output prediction.

2. The method of claim 1, wherein the spectral analysis step is performed using a fast fourier transform algorithm.

3. The method of claim 1, wherein the spectral analysis step is performed using a mel frequency cepstral coefficients algorithm.

4. The method of claim 1, wherein the spectral analysis step is performed using a linear protection coefficient algorithm.

5. The method of claim 1, wherein the spectral analysis step generates a sequence of data frames that include a multi-dimensional vector that describes the spectral content of the speech waveform.

6. The method of claim 5, wherein the spectral analysis step further comprises the step of:
   analyzing the multi-dimensional vector in the sequence of data frames and generating a feature vector for each data frame, the feature vector including the multi-dimensional vector and one or more additional dimensional vectors that describe a spectral feature of the speech waveform.

7. The method of claim 6, wherein the spectral feature is the energy of the speech waveform.

8. The method of claim 6, wherein the spectral feature is a differential calculation of the speech waveform.

9. The method of claim 6, further comprising the step of:
   comparing the feature vectors to a spectral model and computing a set of probability results.

10. The method of claim 9, wherein the spectral model is a Hidden Markov Model.

11. The method of claim 9, wherein the spectral analysis step further comprises the step of:
   comparing the set of probability results with a vocabulary in order to generate the set of syllabic predictions.

12. The method of claim 1, wherein the tonal analysis step further comprises the steps of:
   generating a fundamental frequency contour of the speech waveform using the timing alignment information from the spectral analysis step;
   extracting one or more tonal features from the fundamental frequency contour; and
   generating the tonal scores based on the one or more extracted tonal features.

13. The method of claim 12, wherein the one or more tonal features includes a ratio of the fundamental frequencies for two adjacent syllables in the speech waveform.

14. The method of claim 12, wherein the one or more tonal features includes a slope measurement of the fundamental frequency contour.

15. The method of claim 12, wherein the tonal features includes a ratio of the fundamental frequencies for two adjacent syllables in the speech waveform and a slope measurement of the fundamental frequency contour.

16. The method of claim 12, wherein the generating the tonal scores step further comprises the steps of:
   providing a tonal model including a plurality of sub-models that describe a set of possible adjacent tones; and
   comparing the tonal features to the plurality of sub-models in order to generate the tonal score.

17. The method of claim 12, wherein the generating a fundamental frequency contour step further comprises the steps of:
   determining a center point within each syllable of the speech waveform using a beginning and ending point specified by the timing alignment information;
   determining the energy of the syllable at the center point;
   generating an analysis window for each syllable, wherein the analysis window is centered at the center point and is bounded on either side of the center point by calculating the points at which the energy of the syllable has decreased to a first predetermined percentage of the energy at the center point; and
   computing the fundamental frequency within the analysis window.

18. The method of claim 17, wherein the computing the fundamental frequency step further comprises the steps of:
   computing a difference function within the analysis window to generate at least one global minimum and one or more local minimums, wherein the global minimum has a value that is lower than all of the local minimums; and
   selecting the global minimum in order to compute the fundamental frequency.

19. The method of claim 18, wherein the computing the fundamental frequency step further comprises the steps of:
   computing an average frequency for a plurality of adjacent syllables using the fundamental frequencies computed from the selected global minimums;
   within each analysis window,
      selecting the local minimum that most closely corresponds to the average frequency,
      if the global minimum is less than the selected local minimum by a predetermined threshold level, then using the difference function for the global minimum in order to calculate the fundamental frequency, otherwise using the difference function for the selected local minimum in order to calculate the fundamental frequency.

20. The method of claim 19, wherein the computing the fundamental frequency step further comprises the steps of:
   expanding the analysis window for each syllable to a point where the energy of the syllable has decreased to a second predetermined percentage of the energy at the center point; and
   computing the fundamental frequency within the expanded analysis window.

21. The method of claim 20, wherein the computing the fundamental frequency step further comprises the steps of:
   computing a difference function within the expanded analysis window to generate at least one global minimum and one or more local minimums, wherein the global minimum has a value that is lower than all of the local minimums; and
   selecting the global minimum in order to compute the fundamental frequency.

22. The method of claim 21, wherein the computing the fundamental frequency step further comprises the steps of:
   computing an average frequency for a plurality of adjacent syllables using the fundamental frequencies computed from the selected global minimums;
   within each expanded analysis window,
      selecting the local minimum that most closely corresponds to the average frequency,
      if the global minimum is less than the selected local minimum by a predetermined threshold level, then using the difference function for the global minimum in order to calculate the fundamental frequency, otherwise using the difference function for the selected local minimum in order to calculate the fundamental frequency.

23. A speech recognition system, comprising:
   a spectral modeling block that analyzes a speech waveform and generates a plurality of predicted syllables based upon the spectral content of the speech waveform, wherein each of the predicted syllables includes an associated spectral score and timing alignment information indicating the duration of the syllable; and
   a tonal modeling block that sequentially analyzes the speech waveform using the timing alignment information from the spectral modeling block and generates a plurality of tone scores based upon the tonal content of the speech waveform for each of the predicted syllables.

24. The speech recognition system of claim 23, further comprising:
   a combination block for combining the spectral scores with the tone scores in order to generate an output prediction of the most likely syllable.

25. The speech recognition system of claim 23, wherein the spectral modeling block further comprises:
   a spectral analyzer for performing a spectral analysis of the speech waveform and for generating a multi-dimensional vector that describes the spectral content of the speech waveform.

26. The speech recognition system of claim 25, wherein the spectral analysis utilizes a fast fourier transform algorithm.

27. The speech recognition system of claim 25, wherein the spectral analysis utilizes a mel frequency cepstral coefficients algorithm.

28. The speech recognition system of claim 25, wherein the spectral analysis utilizes a linear protection coefficient algorithm.

29. The speech recognition system of claim 25, wherein the spectral modeling block further comprises:
   a feature extraction block for analyzing the multi-dimensional vector and for generating a feature vector, wherein the feature vector includes the multi-dimensional vector and one or more additional dimensional vectors that describe a spectral feature of the speech waveform.

30. The speech recognition system of claim 29, wherein the spectral feature is the energy of the speech waveform.

31. The speech recognition system of claim 29, wherein the spectral feature is a differential calculation of the speech waveform.

32. The speech recognition system of claim 29, wherein the spectral modeling block further comprises:

a model scoring block for comparing the feature vectors to a spectral model and for computing a set of probability values; and a model database for storing the spectral model.

33. The speech recognition system of claim 32, wherein the spectral model is a Hidden Markov Model.

34. The speech recognition system of claim 32, wherein the spectral modeling block further comprises:

an N-best search block for comparing the set of probability values with a vocabulary and for selecting a set of N most likely predicted syllables; and a vocabulary database for storing the vocabulary.

35. The speech recognition system of claim 23, wherein the tonal modeling block further comprises:

an F0 estimation block for generating a fundamental frequency contour of the speech waveform using the timing alignment information from the spectral modeling block;

a feature extraction block for extracting one or more tonal features from the fundamental frequency contour; and a model scoring block for generating the plurality of tone scores based on the one or more extracted tonal features.

36. The speech recognition system of claim 35, wherein the one or more tonal features includes a ration of the fundamental frequencies for two adjacent syllables in the speech waveform.

37. The speech recognition system of claim 35, wherein the one or more tonal features includes a slope measurement of the fundamental frequency contour.

38. The speech recognition system of claim 35, wherein the tonal features includes a ratio of the fundamental frequencies for two adjacent syllables in the speech waveform and a slope measurement of the fundamental frequency contour.

39. A system for analyzing a speech waveform, comprising:

a spectral modeling branch for generating a spectral score; and a tonal modeling branch for generating a tonal score;

wherein the spectral modeling branch generates timing alignment information that indicates the beginning and ending points for a plurality of syllables in the speech waveform and provides this timing alignment information to the tonal modeling branch in order to sequentially analyze the speech waveform.

40. A method of analyzing a speech waveform carrying a plurality of syllables, comprising the steps of:

performing a spectral analysis on the speech waveform and generating one or more spectral scores for each syllable;

performing a tonal analysis on the speech waveform and generating one or more tonal scores for each syllable, wherein the tonal scores are generating by comparing the fundamental frequencies of two or more adjacent syllables; and combining the spectral scores with the tonal scores to produce an output prediction.

41. A method of recognizing tonal information in a speech waveform, comprising the steps of:

generating timing alignment information for a plurality of syllables in the speech waveform;

determining a center point within each syllable of the speech waveform using a beginning and ending point specified by the timing alignment information;

determining the energy of the syllable at the center point;

generating an analysis window for each syllable, wherein the analysis window is centered at the center point and is bounded on either side of the center point by calculating the points at which the energy of the syllable has decreased to a first predetermined percentage of the energy at the center point;

computing a fundamental frequency contour within the analysis window;

extracting one or more tonal features from the fundamental frequency contour; and generating a plurality of tonal scores for each syllable based on the one or more extracted tonal features.

42. The method of claim 41, wherein the computing a fundamental frequency step further comprises the steps of:

computing a difference function within the analysis window to generate at least one global minimum and one or more local minimums, wherein the global minimum has a value that is lower than all of the local minimums; and selecting the global minimum in order to compute the fundamental frequency.

43. The method of claim 42, wherein the computing a fundamental frequency step further comprises the steps of:

computing an average frequency for a plurality of adjacent syllables using the fundamental frequencies computed from the selected global minimums;

within each analysis window, selecting the local minimum that most closely corresponds to the average frequency, if the global minimum is less than the selected local minimum by a predetermined threshold level, then using the difference function for the global minimum in order to calculate the fundamental frequency, otherwise using the difference function for the selected local minimum in order to calculate the fundamental frequency.

44. The method of claim 43, wherein the computing a fundamental frequency step further comprises the steps of:

expanding the analysis window for each syllable to a point where the energy of the syllable has decreased to a second predetermined percentage of the energy at the center point; and computing the fundamental frequency within the expanded analysis window.

45. The method of claim 44, wherein the computing a fundamental frequency step further comprises the steps of:

computing a difference function within the expanded analysis window to generate at least one global minimum and one or more local minimums, wherein the global minimum has a value that is lower than all of the local minimums; and selecting the global minimum in order to compute the fundamental frequency.

46. The method of claim 45, wherein the computing the fundamental frequency step further comprises the steps of:

computing an average frequency for a plurality of adjacent syllables using the fundamental frequencies computed from the selected global minimums;

within each expanded analysis window, selecting the local minimum that most closely corresponds to the average frequency, if the global minimum is less than the selected local minimum by a predetermined threshold level, then using the difference function for the global minimum in order to calculate the fundamental frequency, otherwise using the difference function for the selected local minimum in order to calculate the fundamental frequency.

* * * * *